(12) United States Patent
Ludois et al.

(10) Patent No.: US 11,404,976 B2
(45) Date of Patent: Aug. 2, 2022

(54) DIELECTRIC NANO-FLUID FOR ELECTROSTATIC MACHINES AND ACTUATORS

(71) Applicant: Wisconsin Alumni Research Foundation, Madison, WI (US)

(72) Inventors: Daniel Colin Ludois, Middleton, WI (US); Daniel Klingenberg, Stoughton, WI (US); Kevin Frankforter, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 215 days.

(21) Appl. No.: 16/563,136

(22) Filed: Sep. 6, 2019

(65) Prior Publication Data

US 2021/0075344 A1    Mar. 11, 2021

(51) Int. Cl.
*H02N 1/00* (2006.01)
*H01B 3/20* (2006.01)

(52) U.S. Cl.
CPC ............... *H02N 1/006* (2013.01); *H01B 3/20* (2013.01); *H02N 1/002* (2013.01)

(58) Field of Classification Search
None
See application file for complete search history.

(56) References Cited

U.S. PATENT DOCUMENTS

| | | | |
|---|---|---|---|
| 4,223,241 A | 9/1980 | Paszyc et al. | |
| 4,416,751 A | 11/1983 | Berkowitz et al. | |
| 6,116,257 A * | 9/2000 | Yokota | F15B 21/065 137/1 |
| 6,359,757 B1 * | 3/2002 | Mallary | G11B 5/5552 137/1 |
| 2013/0078510 A1 * | 3/2013 | Reynolds | H01M 12/005 429/209 |
| 2013/0161232 A1 | 6/2013 | Staack et al. | |
| 2014/0232235 A1 * | 8/2014 | Boughtwood | H02K 13/10 310/219 |
| 2015/0047190 A1 | 2/2015 | Curry et al. | |
| 2016/0211775 A1 | 7/2016 | Ge et al. | |
| 2017/0338750 A1 * | 11/2017 | Ge | H02N 1/002 |
| 2019/0296659 A1 * | 9/2019 | Reitz | H02N 1/002 |

OTHER PUBLICATIONS

International Search Report for PCT/US2020/041958 dated Oct. 28, 2020.
B. GE et al.; "Evaluation of dielectric fluids for macro-scale electrostatic actuators and machinery," 2014 IEEE Energy Conversion Congress and Exposition (ECCE), Pittsburgh, PA, 2014, pp. 1457-1464. doi: 10.1109/ECCE.2014.6953590; US.
Klingenberg, "Particle polarization and nonlinear effects in electrorheological suspensions," MRS Bulletin, vol. 23, pp. 30-34, 8 1998; US.

* cited by examiner

*Primary Examiner* — Katie L. Hammer
(74) *Attorney, Agent, or Firm* — Boyle Fredrickson, S.C.

(57) ABSTRACT

An electrostatic machine employs a high dielectric fluid comprised of a dielectric liquid with suspended dielectric particles. Electrorheological effects are minimized through small particle sizes and steric coatings on those particles limiting the minimum particle-to-particle distance. Low particle volume densities provide greater torque density with managed reduced viscosity.

20 Claims, 4 Drawing Sheets

DIELECTRIC NANO-FLUID FOR ELECTROSTATIC MACHINES AND ACTUATORS

STATEMENT REGARDING FEDERALLY SPONSORED RESEARCH OR DEVELOPMENT

This invention was made with government support under 1452230 awarded by the National Science Foundation. The government has certain rights in the invention.

CROSS REFERENCE TO RELATED APPLICATION

—

BACKGROUND OF THE INVENTION

The present invention relates to electrical machines (e.g., electrical motors, generators, and actuators) and in particular to a high dielectric fluid for increasing the torque density of such machines.

Commercial electrical machines such as motors, generators, solenoids, and the like are primarily electromagnetic machines making use of electrically induced magnetic fields and/or changes in inductance (reluctance) to provide useful work via a movable actuator such as a rotating or translating shaft.

Electrostatic machines provide an alternative to electromagnetic machines which exploit electrically induced electrical fields and change in capacitance to provide a motivating force. Electrostatic machines have a number of advantages over conventional electromagnetic rotating electrical machines including the elimination of magnets and costly rare earth materials, reduction of the significant weight of ferrous materials, and reduced reliance on costly high current copper windings. These machines also utilize little power to "hold" a position against a load force, e.g. robots, industrial automation, flight surfaces, etc.

Such electrostatic machines may provide one or more pairs of electrodes, each electrode of a pair separated by an insulating gap and movable with respect to the other. A motivating electrical field may be generated between the electrodes of each pair to promote the desired motion of the electrodes and mechanical elements to which they are attached.

Electrostatic machines can be found in micro-scale, micro-electromechanical systems (MEMS) which provide extremely small gaps between electrodes allowing high capacitance and high electrical fields. For larger scale rotating machines, for example, those providing macro scale power (watts), force (newtons) or torque (newton-meters) and larger outputs or muscle mimicking actuators (such as Hydraulically Amplified Self-healing Electrostatic (HASEL) actuators), the physical gap between the electrodes may be one to three orders of magnitude larger than that for MEMS machines. This larger gap requires higher applied voltages typically in the tens or even hundreds of thousands of volts for comparable forces.

U.S. Pat. Nos. 9,571,010 and 9,899,937, assigned to the assignee of the present invention and hereby incorporated by reference, describe electrostatic motors employing a high dielectric fluid that can substantially increase the torque density of an electrostatic motor for a given inter electrode gap. In one embodiment, the fluid may be Vertrel-XF™ having a dielectric constant in the range of 7-10 (compared to the dielectric constant of air or a vacuum being approximately 1).

It has been postulated that fluids for electrostatic machines providing higher dielectric constant can be obtained through suspension of high dielectric solid particles in a liquid dielectric material. See generally B. Ge and D. C. Ludois, "Evaluation of dielectric fluids for macro-scale electrostatic actuators and machinery," 2014 IEEE Energy Conversion Congress and Exposition (ECCE), Pittsburgh, Pa., 2014, pp. 1457-1464, co-authored by a coinventor of the present invention and hereby incorporated by reference. Dielectric fluids with suspended dielectric particles are currently used in electrically controlled dampers because of their electrorheological effects which cause the viscosity of these materials to increase rapidly in the presence of an electrical field. Unfortunately, these electrorheological effects make conventional suspensions of this kind unsuitable for electrical actuators where high fields are expected, and the resulting high viscosity can undesirably impede motion of the plates/electrodes during operation of the machine.

SUMMARY OF THE INVENTION

The present invention provides a high dielectric material suitable for electrostatic actuators having a dielectric fluid holding a suspension of dielectric particles. The inventors have determined that adverse electrorheological effects can be managed through particle coatings which, together with control of particle size and concentration, appear to successfully reduce the tendency of the particles to form into high viscosity-inducing structures. Potentially, this dielectric material (liquid plus the appropriate volume fraction of particles) may double the permittivity (dielectric constant) of existing fluids used for electrostatic machines providing a corresponding torque density for such machines exceeding current electromagnetic analogues.

Specifically then, in one embodiment the invention provides an electrostatic machine having a first and second electrode separated across a gap and supported to provide relative motion between the first and second electrode from electrostatic force between the first and second electrode from an applied voltage across the first and second electrode. A dielectric fluid is positioned within the gap, the dielectric fluid including a dielectric liquid and a plurality of dielectric particles suspended in the dielectric liquid and having a core material with a permittivity greater than that of the dielectric fluid and an outer coating having a lower permittivity than the permittivity of the core material.

It is thus a feature of at least one embodiment of the invention to provide an extremely high dielectric fluid to increase the torque density of electrostatic machines through the use of a mixed phase material with coated dielectric particles that manage electrorheological viscosity changes.

The dielectric particles may have an average diameter less than 50 nm and preferably average diameter of less than 15 nm.

It is thus a feature of at least one embodiment of the invention to provide a particle size that works with a dielectric coating to substantially reduce electrorheological effects that could create unacceptable levels of viscosity in the dielectric fluid.

The coating may have a permittivity less than or equal to the permittivity of the dielectric fluid.

It is thus a feature of at least one embodiment to minimize the forces of electrical attraction in polarized dielectric materials of the core material.

The coating may provide a stable suspension of the dielectric particles within the dielectric liquid.

It is thus a feature of at least in one embodiment of the invention to provide a coating that provides a stable suspension of the dielectric particles.

The coating may separate the core dielectric material of adjacent dielectric particles by at least 0.1 nm.

It is thus a feature of at least one embodiment of the invention to balance the competing forces of attraction (electrical polarizing adhesion, van der Waals forces, etc.) and forces of separation (hydrodynamic forces including Brownian motion, etc.) which tend to break up adhesions between particles by ensuring a separation distance that reduces electrostatic attraction as an inverse square relationship to the separation distance.

The coating may be an organosilicon compound.

It is thus a feature of the invention to provide a material that forms a strong attachment to common dielectric particle materials such as barium titanate and titanium dioxide.

The dielectric liquid may be a nonpolar fluid and preferably an aprotic fluid and the coating may provide a nonpolar outer surface to the dielectric particle.

It is thus a feature of at least one embodiment of the invention to provide improved dispersion of the particles in a nonpolar dielectric fluid.

The core material is selected from the group consisting of barium titanate, titanium dioxide, strontium titanate, and calcium titanate.

It is thus a feature of at least one embodiment of the invention to provide a system that can work with a variety of commercially practical high dielectric materials The particle volume fraction of the dielectric particles within the dielectric liquid may be greater than 0.05 and less than 0.3, or preferably greater than 0.15 and less than 0.25.

It is thus a feature of at least one embodiment of the invention to provide a balance between increasing permittivity in the dielectric fluid and reducing viscosity of the dielectric fluid.

The permittivity of the dielectric liquid may be greater than 3.

It is thus a feature of at least one embodiment of the invention to provide a foundational fluid with a high dielectric value.

The dielectric particles may have a relative permittivity of greater than 10.

It is thus a feature of at least one embodiment of the invention to provide a dielectric material substantially higher than that available from readily usable dielectric fluids.

The dielectric particles may have a relative permittivity of less than 200 times the relative permittivity of the dielectric liquid.

It is thus a feature of at least one embodiment of the invention to permit the use of lower dielectric solid materials based on the inventor's determination of the limited efficacy dielectric materials having a relative permittivity of greater than 100 times the relative permittivity of the dielectric liquid caused by saturation of the dielectric particle material in electrical field.

These particular objects and advantages may apply to only some embodiments falling within the claims and thus do not define the scope of the invention.

DETAILED DESCRIPTION OF THE PREFERRED EMBODIMENT

Electrical Machine Construction

Figure 1:
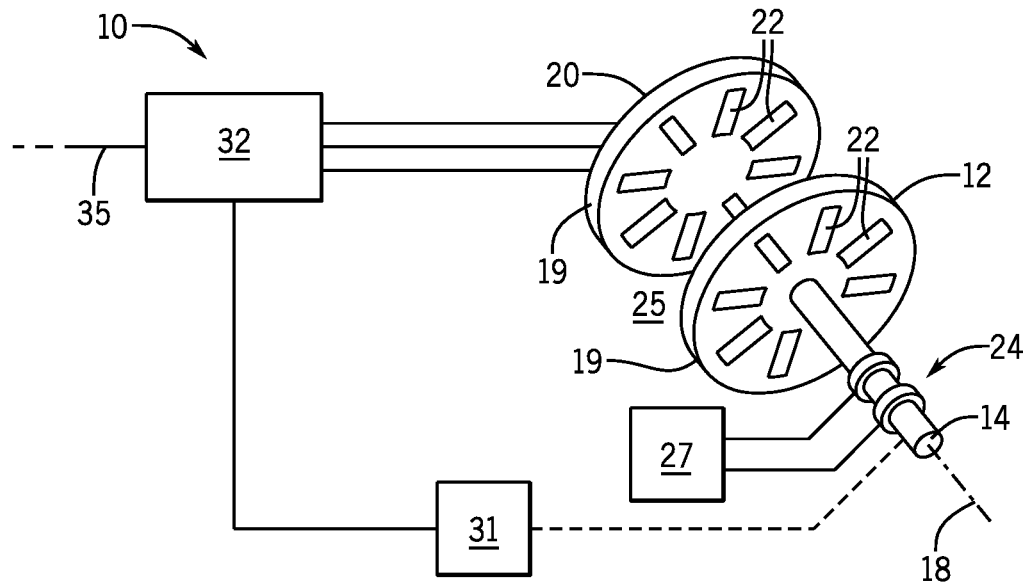
FIG. 1 is an exploded perspective view of an axial field electrostatic machine suitable for use in the present invention.

Referring now to FIG. 1, an axial field rotating electrical machine 10 per one embodiment of the present invention may provide a rotor 12 having insulating rotor disk 19 mounted on an axle 14 for rotation about an axis 18. The axle 14 may be supported at opposite ends by bearings (not shown) and be attached to other rotating machinery, for example, to drive that machinery in the manner of a conventional motor or to receive a driving force when the axial field rotating electrical machine 10 is used as a generator.

The rotor 12 may be axially aligned between two stators 20 (only one shown in FIG. 1) each providing an insulating stator disk 19. Each of the rotor 12 and stator 20 may have a set of radially extending conductive electrodes 22 supported on the respective disks 19 and angularly spaced about the axis 18 so that the electrodes 22 opposed across the rotor 12 and stator 20 move into alignment and out of alignment with rotation of the rotor 12. For simplicity, the stator electrodes 16 and rotor electrodes 16 are shown on the visible surfaces of the stator 20 and rotor 12; however, they will normally be on facing surfaces to be closely proximate.

The space between the electrodes 22 on the rotor 12 and stator 20 may be filled with a dielectric fluid 25 as will be discussed in more detail below. Spacings between the disks 19 of the stator 20 and rotor 12 will normally range between 0.5 mm and 5 mm. A properly phased electrical voltage applied across the conductive electrodes 22 on the rotor 12 and stator 20 causes rotation of the rotor 12 driven by electrostatic attraction between the electrodes 22. The term axial field rotating electrical machine refers generally to the principal component of the electrostatic field between the conductive electrodes 22 being parallel to an axis 18 of rotation of the rotor 12.

A slip ring 24 or other brushless type of power transfer (capacitive or inductive) is attached to the axle 14 to conduct electricity from a stationary rotor power supply 27 to the rotating rotor electrodes 22 to provide an electrostatic polarization of the rotor 12.

A variable speed drive 32 may provide for controlled application of power to the stator electrodes 22 of the stator 20 based on the position signal generated by a position detection system 31 measuring the position of the rotor 12. In this regard, the variable speed drive 32 may receive a command signal 35, for example, speed or torque or other related quantity, and determine the proper variable currents to be applied to the stator electrodes 22 necessary to provide voltage regulation during operation of an axial field rotating electrical machine 10 in conformance with that command signal 35. As such, the output of the variable speed drive 32 will provide multiple phases 36 associated with different stator electrodes 22 providing sinusoidal or other continuously varying signals to those stator electrodes 22 necessary to maximize motor performance. A variable speed drive 32 suitable for use in the present invention is described in U.S. Pat. No. 9,979,323 assigned to the assignee of the present application and hereby incorporated by reference.

Figure 2:
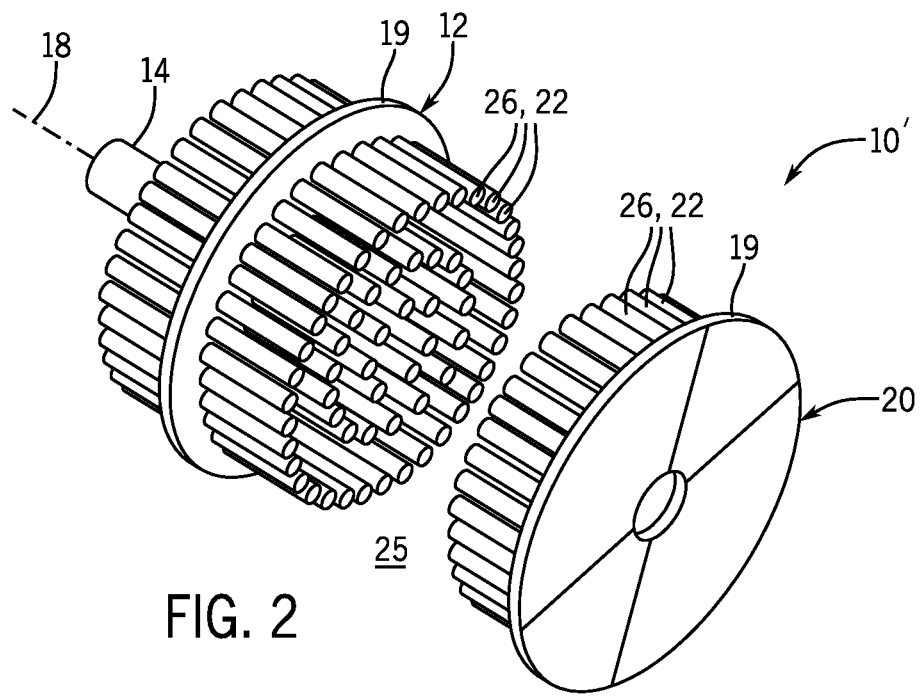
FIG. 2 is an exploded perspective view similar to that of FIG. 1 of a radial field electrostatic machine also suitable for use with the present invention.

Referring now to FIG. 2, in a radial field rotating electrical machine 10', the rotor 12 may include a set of axially extending concentrically arranged rotor pegs 26 arranged in constant radius rows parallel to and about the axis 18 supported by an insulating rotor disk 19. Each of the rotor pegs 26 provides an equivalent electrode 22. Flanking the rotor 12 along the axis 18 are two stators 20 (only one shown in FIG. 2), also having axially extending pegs 26 supported on corresponding insulating rotor disks 19, providing for corresponding electrodes 22 and arranged in rows fitting between the rows of pegs 26 of the rotor 12. Again, the space between the electrodes 22 on the rotor 12 and stator 20 may be filled with a dielectric fluid 25 and the spacing between the rows of pegs 26 of the stator 20 and rotor 12 will normally range between 0.5 mm and 5 mm.

Electrical connections to the electrodes 22 create an electrical field between electrodes 22 on the stator 20 and rotor 12 providing a torque rotating the rotor 12.

Other elements of the radial field rotating electrical machine 10' including the power supply 27, slip rings 24, position sensor 31, and variable speed drive 32 may be otherwise identical or minor variations on those described with respect to FIG. 1.

Figure 3A:
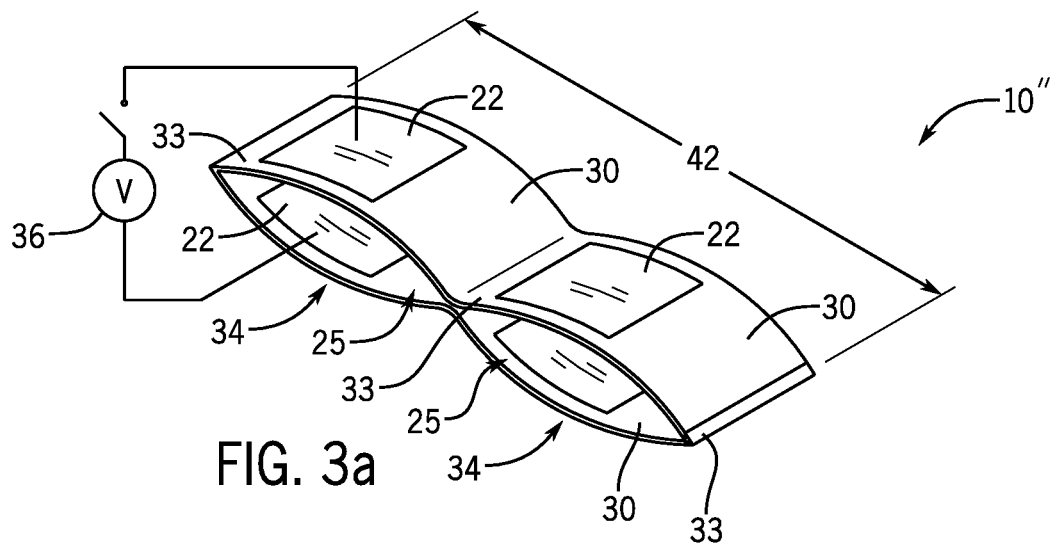
FIGS. 3a and 3b are fragmentary perspective views of an artificial muscle in an unactivated and activated state, respectively, and also suitable for use with the present invention.
Figure 3B:
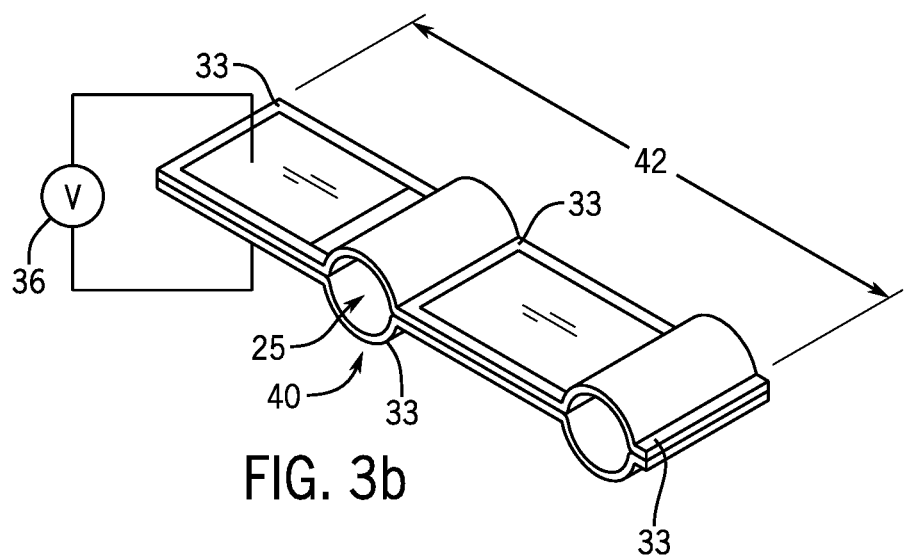

Referring now to FIG. 3, an artificial muscle electrical machine 10", for example, in the form of Hydraulically Amplified Self-healing Electrostatic (HASEL) type devices, may provide for opposed flexible membranes 30 joined along spaced, parallel seam lines 33 to provide for closed hollow pockets 34 flanked by the membranes 30 and filled with the dielectric fluid 25. Conductive electrodes 22 may be positioned in opposition on opposed membranes 30 on opposite sides of the pockets 34. Energizing the electrodes 22 on either side of a pocket 34, for example, with a high-voltage source 36 as shown in FIG. 3b, causes an electrostatic force between the electrodes 22 to draw them together. This movement forces the intervening dielectric fluid 25 in the pocket 34 into a remaining portion 40 of the pocket 34 causing the membrane 30 surrounding that remaining portion 40 to billow outward reducing a length 42 of the artificial muscle electrical machine 10". This reduction in length can be used like a muscle to perform useful work.

Figure 4:
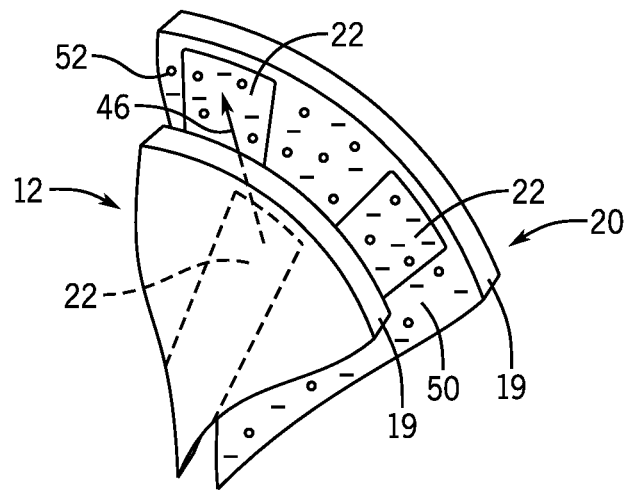
FIG. 4 is a fragmentary cross-sectional view along the rotor axis of the axial field electrostatic machine of FIG. 1 showing positioning of the dielectric fluid between stator and rotor plates and a direction of an electrostatic field producing a tangential torque component.

Referring now to FIGS. 1 and 4, the dielectric fluid 25 of the axial field rotating electrical machine 10 may be positioned between the disks 19 of the stator 20 and rotor 12 and between the electrodes 22 of the stator 20 and rotor 12. As so positioned, an increased permittivity of the dielectric fluid 25 increases the electrostatic force 46 between electrodes 22 for given separation between the electrodes 22 of the stator 20 and rotor 12 and the given voltage on the electrodes 22 of the stator 20 and rotor 12. The result is an increase in torque density (available torque per volume of the motor structure) for the electrical machine 10.

Figure 5:
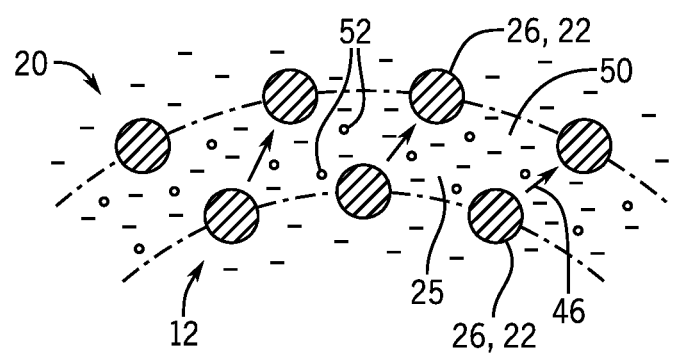
FIG. 5 is a fragmentary cross-sectional view across the rotor axis of the radial field electrostatic machine of FIG. 2 showing positioning of a dielectric fluid of the present invention in between rotor and stator pegs and a direction of an electrostatic field producing a tangential torque component.

Referring now to FIGS. 2 and 5, in a similar manner, the pegs 26 of the stator 20 and rotor 12 of the radial field rotating electrical machine 10' may be immersed in the dielectric fluid 25. In this application, a dielectric fluid 25 with increased permittivity increases the electrostatic force 46 between successive rows of pegs 26 for given separation between the pegs 26 and voltage applied to the pegs 26, permitting higher torque densities.

Figure 6:
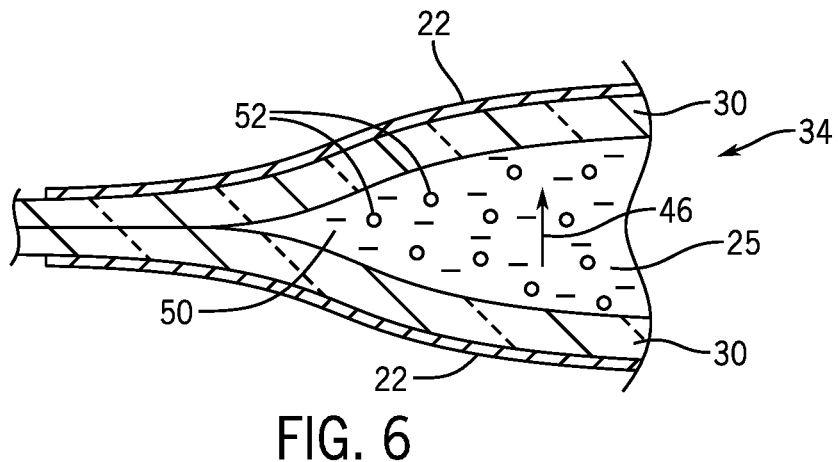
FIG. 6 is a cross-sectional view along a contraction axis of the artificial muscle of FIG. 3 in the relaxed state showing the positioning of the dielectric fluid of the present invention between opposed plates of that muscle.

Finally referring to FIGS. 3 and 6, the electrostatic force 46 between the electrodes 16 of the membranes 30 on opposite sides of the pockets 34 may be increased through the use of a dielectric fluid 25 with higher permittivity. Again, a dielectric fluid 25 will increase the force between the electrodes 22 for a given separation and voltage permitting larger volumes of displacement or faster operation or the like.

Axial field rotating electrical machines 10 and radial field rotating electrical machines 10' machines suitable for use with the present invention are described in U.S. Pat. Nos. 10,243,485; 9,899,937; 9,866,148; and 9,571,010 all assigned to the assignee of the present application and hereby incorporated by reference.

Dielectric Fluid

In this use, the dielectric fluid 25 desirably has a high dielectric constant or permittivity (to increase the electrostatic force), a high voltage electrical breakdown (to prevent arcing between the electrodes 22), low viscosity (to reduce viscous drag between the moving electrodes 22), and low conductivity to reduce current flow between the electrodes 22. These properties may be enhanced through the use of a dielectric fluid 25 formed of a dielectric liquid 50 suspending dielectric particles 52 therein.

Figure 7:
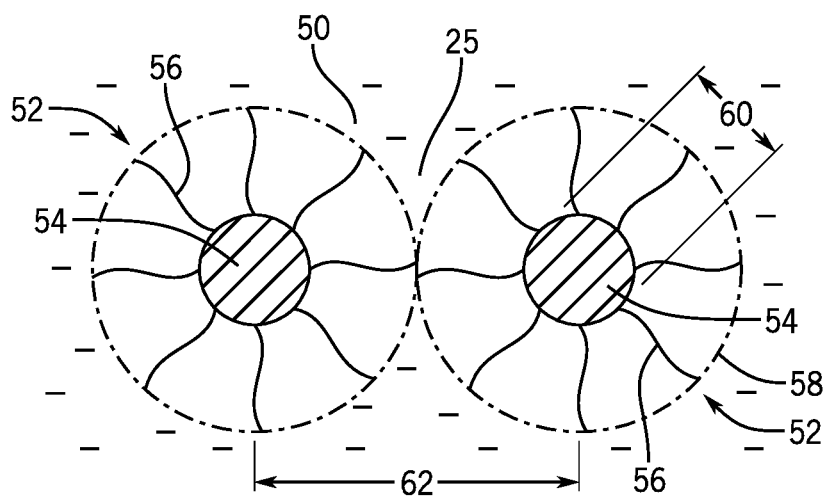
FIG. 7 is a diagrammatic view of the sterically coated dielectric particles suspended in the dielectric liquid of the dielectric fluid of the previous figures showing the spacing provided by the steric coating.

Referring now to FIG. 7, in one embodiment, the dielectric fluid 25 may provide a dielectric liquid 50 of isoamyl isovalerate ($C_{10}H_{20}O_2$) suspending dielectric cores 54 of cubic phase barium titanate ($BaTiO_3$). Isoamyl isovalerate has a dielectric constant of 3.6 and a viscosity of approximately 1.4 mPa·s and an electrical breakdown of greater than 10,000 V per millimeter. Preferably, the dielectric fluid 25 is aprotic (cannot donate hydrogen) and will have a dielectric constant or relative permittivity of greater than three and less than 15 (thus excluding water and alcohol, for example) and a viscosity of less than 3 mPa·s. The invention contemplates that other esters and carbonates may also be used for the dielectric fluid including for example pentyl propionoate, geranyl propionoate, methyl (£)-5,5-dimethyl-hex-3-enoate. isoamyl isovalerate; and combinations of two or more thereof. In this regard, the application incorporates U.S. Pat. No. 9,866,144 the disclosure of PCT application WO2018089342 and the dielectric liquids described therein.

The dielectric cores 54 may have a coating 56 of octadecyltrimethoxysilane which provides a steric separation periphery 58 about the dielectric cores 54 that reduces a propensity of the dielectric cores 54 to form into chains when exposed to high electrical fields such as can produce substantial electrorheological viscosity in the electrical machines 10 discussed above. The invention contemplates that other organosilicone (silane) materials may also be suitable such as hexamethyldisilazane, or trimethoxypropylsilane and as noted above, that the dielectric cores 54 may alternatively be titanium dioxide, strontium titanate, barium/strontium titanate, and calcium titanate or mixtures of these materials.

While the inventors do not wish to be bound by a particular theory, the effect of the coating 56 in reducing agglomeration is believed to be the result of a reduction of van der Waals interaction between the dielectric cores 54 and electrostatic attraction between the dielectric cores 54, both falling off with separation. In this respect, coating 56 when bonded to the dielectric cores 54 provides a low permittivity material, for example, having a permittivity less than the dielectric cores 54 or the dielectric liquid 50, reducing electrical polarization that might drive such agglomeration. The coating 56 also provides dielectric particles 52 that present an outer nonpolar surface providing improved suspension in the nonpolar or aprotic dielectric liquid 50. Importantly, the core size 60 is substantially reduced to provide a stable suspension of the particles and without sedimentation by promoting a balance between Brownian and steric forces (acting to separate particles) and electrostatic polarization, van der Waals forces, and hydrodynamic forces (acting to aggregate particles).

In this regard, core size 60 may be less than 50 nm and preferably less than 15 nm. The core size 60 as used herein refers to an average diameter (mode) of the dielectric cores 54 and describes the cross-sectional dimension of a circumscribing sphere for irregular particle shapes. The dielectric cores 54 may have a relative permittivity of greater than 10 while the dielectric liquid 50 preferably has permittivity of greater than 3. Generally, the ratio of the permittivity of the dielectric cores 54 to the permittivity of the dielectric liquid 50 will be less than 1000.

The steric coating 56 may be substantially continuous and provide a periphery 58 having a diameter of at least ½ nm and thus a separation 62 between adjacent particles' dielectric cores 54 of at least one nanometer and ideally greater than 0.1 nm. The volume fraction of dielectric particles 52 with respect to volume of the dielectric liquid 50 is preferably less than 0.3 and more than 0.05 and in one embodiment less than 0.25 and more than 0.15. Desirably the dielectric fluid will be substantially nonconductive in the application of the electrical machine 10.

Synthesis of the Dielectric Fluid

Cubic phase barium titanate for the dielectric cores 54 may be synthesized according to the techniques described in "Preparation of Dense $BaTiO_3$ Ceramics from Sol-Gel-Derived Monolithic Gels" (1995) Hirokazu Shimooka, Makoto Kuwabara Kyushu Institute of Technology, Kitakyushu-shi, Fukuoka, Japan, hereby incorporated by reference.

Isoamyl isovalerate ($C_{10}H_{20}O_2$, 98+%) may be purchased from Sigma-Aldrich. Prior to preparing suspensions, the isoamyl isovalerate may be distilled under vacuum over molecular sieves to remove absorbed moisture. The metal oxide $BaTiO_3$ may be then coated with octadecyltrimethoxysilane using techniques analogous to the technique described in: "Transparent $BaTiO_3$/PMMA Nanocomposite Films for Display Technologies: Facile Surface Modification Approach for $BaTiO_3$ Nanoparticles" (2018) Koichi Suematsu, Masashi Arimura, Naoyuki Uchiyama, Shingo Saita Fukuoka Industrial Technology Center, Fukuoka, Japan, also hereby incorporated by reference.

Dielectric suspensions can then be prepared by mixing the coated $BaTiO_3$ powders into the isoamyl isovalerate ($C_{10}H_{20}O_2$, 98+ percent) commercially available from Sigma-Aldrich in the desired volumetric concentrations.

The invention contemplates that other dielectric liquids 50 may be used including common transformer oils, oils with relatively high dielectric constants including esters and fluorinated hydrocarbons such as Vertrel® XF, a hydrocarbon fluid ($C_5H_2F_{10}$) having a dielectric constant from 7-10, a breakdown strength of 14,000 to 28,000 volts/mm, a volume resistivity (ohm-cm) of 109-1011 and a viscosity $6.7 \times 10^{-4} \mu$ (Pa·s). Generally the present invention contemplates a breakdown strength of the dielectric liquid 50 of at least 5000 volts per millimeter and desirably greater than 10,000 volts per millimeter and the dielectric constant of at least three and desirably greater than seven. As used herein, substantially nonconductive refers Certain terminology is used herein for purposes of reference only, and thus is not intended to be limiting, for example, terms such as "upper," "lower," "above," and "below" refer to directions in the drawings to which reference is made. Terms such as "front," "back," "rear," "bottom," and "side" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second," and other such numerical terms referring to structures do not imply a sequence or order unless clearly indicated by the context.

When introducing elements or features of the present disclosure and the exemplary embodiments, the articles "a," "an," "the," and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the order discussed or illustrated, unless specifically identified as an order of performance. It is also to be understood that additional or alternative steps may be employed.

It will be generally understood that the electrical machines described herein may be operated either as motors/actuators or generators/sensors.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An electrostatic machine comprising:
a first and second electrode separated across a gap and supported to provide relative motion between the first and second electrode from electrostatic force between the first and second electrode from an applied voltage across the first and second electrode; and a substantially nonconductive dielectric fluid positioned within the gap, the dielectric fluid comprising:

(a) a dielectric liquid; and (b) a plurality of dielectric particles suspended in the dielectric liquid and having a core material with a permittivity greater than that of the dielectric fluid and an outer coating having a lower permittivity than the permittivity of the core material, operative to reduce the formation of viscosity enhancing structures of the dielectric particles.

2. The electrostatic machine of claim 1 wherein the dielectric particles have an average diameter less than 50 nm.

3. The electrostatic machine of claim 2 wherein the dielectric particles have an average diameter of less than 15 nm.

4. The electrostatic machine of claim 1 wherein coating further has a permittivity no greater than the dielectric fluid.

5. The electrostatic machine of claim 4 wherein the coating provides stable suspension of the dielectric particles within the dielectric liquid.

6. The electrostatic machine of claim 4 wherein the coating separates the core dielectric material of adjacent dielectric particles by at least 0.1 nm.

7. The electrostatic machine of claim 4 herein the coating is an organosilicon compound.

8. The electrostatic machine of claim 4 wherein the dielectric liquid is a nonpolar fluid and the coating provides a nonpolar outer surface to the dielectric particle.

9. The electrostatic machine of claim 1 wherein the dielectric particle provides a core material selected from the group consisting of barium titanate, titanium dioxide, strontium titanate, barium/strontium titanate, and calcium titanate.

10. The electrostatic machine of claim 1 wherein a particle volume fraction of the dielectric particles within the dielectric liquid is greater than 0.05 and less than 0.3.

11. The electrostatic machine of claim 10 wherein the particle volume fraction of the dielectric particles within the dielectric liquid is greater than 0.15 and less than 0.25.

12. The electrostatic machine of claim 1 permittivity of the dielectric liquid is greater than three and less than 15.

13. The electrostatic machine of claim 1 wherein the dielectric particles have a relative permittivity of greater than 10.

14. The electrostatic machine of claim 1 wherein the dielectric particles have a relative permittivity greater than 10 times the relative permittivity of the dielectric liquid.

15. The electrostatic machine of claim 1 wherein the first and second electrodes are on a stator and rotor of an electrostatic machine.

16. The electrostatic machine of claim 15 wherein the electrodes of the stator and rotor are opposed axially along an axis of a shaft about which the rotor rotates.

17. The electrostatic machine of claim 15 wherein the electrodes of the stator and rotor are opposed radially along the line of radius from an axis about which the rotor rotates.

18. The electrostatic machine of claim 1 wherein the first and second electrodes are on opposite walls of a flexible pouch or bellows holding the dielectric liquid.

19. The electrostatic machine of claim 1 wherein the outer coating reduces a propensity of the suspended dielectric particles to form into chains.

20. The electrostatic machine of claim 1 wherein the suspended dielectric particles include individual particles that are suspended independently of other particles.

* * * * *